(12) United States Patent
Choi et al.

(10) Patent No.: US 10,411,254 B2
(45) Date of Patent: Sep. 10, 2019

(54) NEGATIVE ELECTRODE ACTIVE MATERIAL AND SECONDARY BATTERY INCLUDING THE SAME

(71) Applicant: LG CHEM, LTD., Seoul (KR)

(72) Inventors: Jung Hyun Choi, Daejeon (KR); Yong Ju Lee, Daejeon (KR); Eun Kyung Kim, Daejeon (KR); Su Jin Park, Daejeon (KR); Hyun Chul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 26 days.

(21) Appl. No.: 15/295,330

(22) Filed: Oct. 17, 2016

(65) Prior Publication Data

US 2017/0133671 A1    May 11, 2017

(30) Foreign Application Priority Data

Oct. 15, 2015 (KR) .................. 10-2015-0143862
Oct. 14, 2016 (KR) .................. 10-2016-0133662

(51) Int. Cl.
*H01M 4/13* (2010.01)
*H01M 4/36* (2006.01)
(Continued)

(52) U.S. Cl.
CPC ......... *H01M 4/366* (2013.01); *H01M 4/0419* (2013.01); *H01M 4/13* (2013.01);
(Continued)

(58) Field of Classification Search
CPC ...... H01M 4/0419; H01M 4/13; H01M 4/139; H01M 4/366; H01M 4/386; H01M 4/587; H01M 4/62
See application file for complete search history.

(56) References Cited

U.S. PATENT DOCUMENTS

2005/0074672 A1* 4/2005 Matsubara .......... H01M 4/0421
                                                               429/231.95
2006/0134516 A1   6/2006 Im et al.
(Continued)

FOREIGN PATENT DOCUMENTS

KR   10-2006-0069738 A   6/2006
KR   10-2009-0124157 A   12/2009
(Continued)

OTHER PUBLICATIONS

Li, F.-S., et al. "A dimensionally stable and fast-discharging graphite-silicon composite Li-ion battery anode enabled by electrostatically self-assembled multifunctional polymer-blend coating", Chemical Communications, vol. 51, pp. 8429-8431, published Jan. 22, 2015. (Year: 2015).*

(Continued)

*Primary Examiner* — Sarah A. Slifka
*Assistant Examiner* — Lilia Nedialkova
(74) *Attorney, Agent, or Firm* — Birch, Stewart, Kolasch & Birch, LLP

(57) ABSTRACT

The present disclosure relates to a negative electrode active material and a secondary battery including the same, and in particular, provides a negative electrode active material particle including a core including a carbon-based active material, and a shell surrounding the core and including a polymer, wherein silicon-based active material particles are embedded in the shell, and at least a part of the silicon-based active material particles is exposed to a surface of the shell.

13 Claims, 1 Drawing Sheet

(51) Int. Cl.
  *H01M 4/38*    (2006.01)
  *H01M 4/587*   (2010.01)
  *H01M 4/04*    (2006.01)
  *H01M 4/62*    (2006.01)
  *H01M 4/139*   (2010.01)

(52) U.S. Cl.
  CPC ........... *H01M 4/139* (2013.01); *H01M 4/386* (2013.01); *H01M 4/587* (2013.01); *H01M 4/62* (2013.01)

(56) References Cited

U.S. PATENT DOCUMENTS

| | | | |
|---|---|---|---|
| 2009/0297945 A1* | 12/2009 | Hwang | H01M 4/133 429/207 |
| 2010/0136432 A1 | 6/2010 | Kim | |
| 2011/0309310 A1 | 12/2011 | Koller et al. | |
| 2012/0115033 A1* | 5/2012 | Kim | H01M 4/133 429/231.8 |
| 2013/0288126 A1 | 10/2013 | Liu et al. | |
| 2015/0303460 A1* | 10/2015 | Murata | C07F 7/1892 429/231.8 |
| 2016/0006019 A1* | 1/2016 | Jung | H01M 4/13 429/231.8 |
| 2016/0013481 A1* | 1/2016 | Jeong | H01M 4/364 429/231.8 |
| 2016/0013491 A1 | 1/2016 | Liu et al. | |

FOREIGN PATENT DOCUMENTS

| | | |
|---|---|---|
| KR | 10-2010-0062083 A | 6/2010 |
| KR | 10-2011-0100209 A | 9/2011 |

OTHER PUBLICATIONS

Tu, J. et al. "In-Situ Synthesis of Silicon/Polyaniline Core/Shell and its Electrochemical Performance for Lithium-Ion Batteries", Journal of Electrochemical Society, vol. 160, pp. A1916-A1921, published Sep. 5, 2013. (Year: 2013).*

* cited by examiner

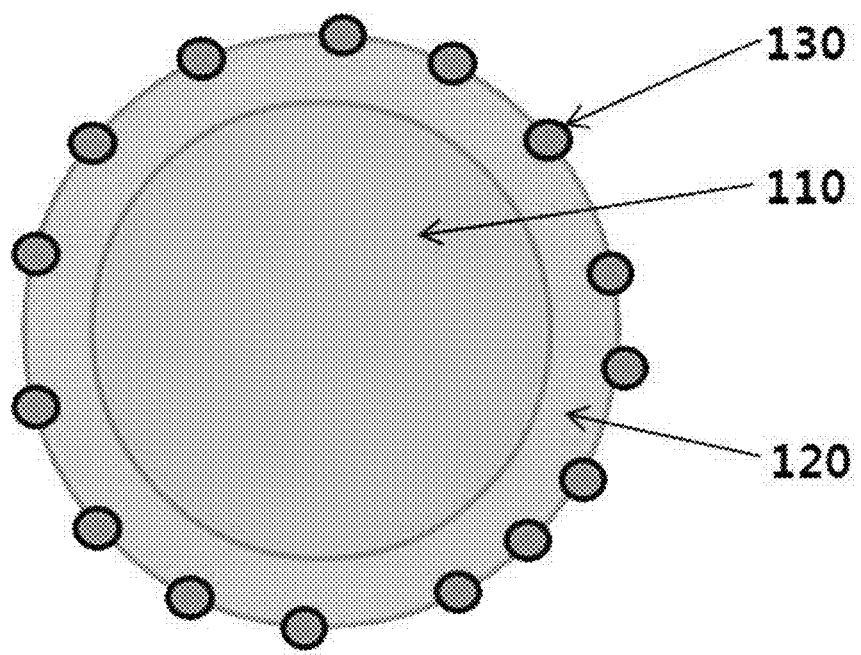

NEGATIVE ELECTRODE ACTIVE MATERIAL AND SECONDARY BATTERY INCLUDING THE SAME

The present application claims priority to and the benefits of Korean Patent Application No. 10-2015-0143862 filed with the Korean Intellectual Property Office on Oct. 15, 2015 and Patent Application No. 10-2016-0133662 filed with the Korean Intellectual Property Office on Oct. 14, 2016, the entire contents of which are incorporated herein by reference.

FIELD OF THE INVENTION

The present disclosure relates to a negative electrode active material and a secondary battery including the same.

DESCRIPTION OF THE RELATED ART

Due to rapid increases in the use of fossil fuels, demands for the use of alternative energy or clean energy have increased, and as part of such demands, fields of power generation and power accumulation using an electrochemical reaction have been most actively studied.

Current typical examples of electrochemical devices using such electrochemical energy include secondary batteries, and the area of application tends to be increasingly expanded. With recent increases in technology developments and demands for portable devices such as portable computers, mobile phones and cameras, demands for secondary batteries as an energy source have rapidly increased, and among such secondary batteries, researches on lithium secondary batteries exhibiting high energy density and operation potential, having a long cycle life and a low self-discharge rate have been much conducted, and lithium secondary batteries have been commercialized and widely used.

A secondary battery is generally formed with a positive electrode, a negative electrode and an electrolyte, and lithium ions perform a role of transferring energy while travelling back and forth between the two electrodes such that lithium ions coming from a positive electrode active material by first charge are inserted into a negative electrode active material such as carbon particles, and deintercalated again when discharged, which makes charge and discharge possible.

For example, a lithium secondary battery has a structure in which a lithium electrolyte is impregnated to an electrode assembly formed with a positive electrode including a lithium transition metal oxide as an electrode active material, a negative electrode including a carbon-based active material, and a porous separator. The positive electrode is prepared by coating a positive electrode mixture including the lithium transition metal oxide on aluminum foil, and the negative electrode is prepared by coating a negative electrode mixture including the carbon-based active material on copper foil.

Among silicon-based materials that have been studied as a high capacity material, a silicon and carbon composite active material is an active material putting a silicon-based material on the surface of a carbon-based negative electrode active material, and has received attention as a high capacity secondary battery material due to excellent discharge efficiency (80%) as well as capacity higher than theoretical capacity (372 mAh/g) that a carbon-based negative electrode active material has.

However, due to weak adhesive strength between carbon and silicon interfaces, a phenomenon of an outer silicon layer being detached from carbon during an electrode preparation process occurs. Such a phenomenon reduces conductivity of silicon and increases irreversible capacity, and as a result, capacity and efficiency revelation are reduced.

Accordingly, development of negative electrode active materials having excellent conductivity while enhancing adhesive strength of carbon and silicon has been required.

[Prior Art Document] Korean Patent Application Laid-Open Publication No. 10-2011-0100209

DISCLOSURE OF THE INVENTION

Technical Problem

The present disclosure is directed to providing a negative electrode active material particle having favorable conductivity and low irreversible capacity by attaching a carbon-based active material and a silicon-based active material using a polymer.

The present disclosure is also directed to providing a secondary battery, a battery module and a battery pack including the negative electrode active material particle.

Technical Solution

The present disclosure has been made in view of the above, and one embodiment of the present disclosure provides a negative electrode active material particle including a core including a carbon-based active material, and a shell surrounding the core and including a polymer, wherein silicon-based active material particles are embedded in the shell, and at least a part of the silicon-based active material particles are exposed to a surface of the shell.

Another embodiment of the present disclosure provides a secondary battery, a battery module and a battery pack including a negative electrode on which a negative electrode mixture including the negative electrode active material particle is coated, a positive electrode and a liquid electrolyte.

Advantageous Effects

A negative electrode active material particle according to the present disclosure includes a polymer material so as to attach a silicon-based active material on a surface of a carbon-based active material. The polymer material is capable of simultaneously interacting with the silicon-based active material and the carbon-based active material while having conductivity. Accordingly, the polymer material not only performs a role of pulling and attaching the silicon-based active material and the carbon-based active material, but also maintains excellent conductively. Furthermore, the silicon-based active material may be exposed to the negative electrode active material particle surface, and therefore, is capable of being in direct contact with a conductor, and as a result, more superior conductivity can be exhibited.

DESCRIPTION OF DRAWINGS

FIG. 1 is a schematic diagram illustrating a negative electrode active material particle according to one embodiment of the present disclosure.

MODE FOR CARRYING OUT THE INVENTION

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which inventors may suitably define the concepts of terms in order to describe their own invention in the best possible way.

Terms used in the present specification are used only for describing exemplary embodiments, and are not intended to limit the present disclosure. Singular expressions include plural expressions unless they explicitly mean otherwise contextually.

In the present specification, terms such as "include", "provide" or "have" are intended to designate the presence of worked characteristics, numbers, steps, constituents or combinations thereof, and need to be construed not to eliminate the possibility of presence or addition of one or more other characteristics, numbers, steps, constituents or combinations thereof in advance.

When referring to FIG. 1, a negative electrode active material particle according to one embodiment of the present disclosure includes a core (110) including a carbon-based active material, and a shell (120) surrounding the core and including a polymer, wherein silicon-based active material particles (130) are embedded in the shell, and at least a part of the silicon-based active material particles are exposed to a surface of the shell.

In the negative electrode active material, a few numbers of the silicon-based active material particles present in the shell may be exposed to the surface of the shell, and as one specific example, at least a part of all the silicon-based active material particles present in the shell may be exposed to outside the surface of the shell.

The carbon-based active material may have a globular shape, and may have an average diameter ($D_{50}$) of 5 μm to 20 μm. As the carbon-based active material, one or more types selected from the group consisting of natural graphite, artificial graphite, hard carbon and soft carbon may be used, and specifically, when using natural graphite, the polymer may be favorably distributed on the graphite surface due to a functional group present on the graphite surface.

The shell including a polymer may have a form covering at least a part of the carbon-based active material, and specifically, may have a form covering the whole surface of the carbon-based active material. The shell may have a uniform thickness. The shell including a polymer may have a thickness of 20 nm to 100 nm. The shell having a thickness of less than 20 nm may cause a problem of reducing adhesive strength of the silicon-based active material particles, and the thickness of greater than 100 nm may cause a problem of the silicon-based active material particles not being exposed to the shell surface. As the polymer, one or more types selected from the group consisting of poly(l-pyrenemethyl methacrylate) which is a homopolymer of pyrene, poly(l-pyrenemethyl methacrylate-co-triethylene oxide methyl ether methacrylate) which is a copolymer of pyrene, a polymer changing the pyrene side chain of the homopolymer or the copolymer of pyrene to anthracene, polyparaphenylene, polyaniline, a polymer having a carbonyl group and methylbenzoic ester, and polyacetylene having a conjugation bond may be used. The polymer having a carbonyl group and methylbenzoic ester may be poly(9,9-dioctylfluorene-co-fluorenone-co-methylbenzoic ester (PFFOMB).

The polymer may include either a benzene ring or a double/triple bond, and therefore, may simultaneously interact with the silicon-based active material and the carbon-based active material using electrostatic attraction. Accordingly, adhesion of the silicon-based active material and the carbon-based active material may be readily achieved. In addition, by having a n-bond, conductivity is exhibited since electrons are readily transferred, and accordingly, the negative electrode active material may exhibit low resistance since electrons are readily transferred in the carbon-based active material and the silicon-based active material.

Furthermore, the polymer may be modified with a functional group including oxygen or nitrogen, or the surface of the shell may be modified with a functional group including oxygen or nitrogen, and the functional group more strongly attracts the silicon-based active material with electrostatic attraction while exhibiting negative charge due to oxygen or nitrogen having high electronegativity, which is effective in enhancing adhesive strength.

The silicon-based active material particles may have a globular shape, and may have an average diameter ($D_{50}$) of 10 nm to 150 nm. The silicon-based active material particles having an average diameter of greater than 150 nm may lead to mechanical defects in the negative electrode active material due to a volume change caused by lithium ion deintercalation, and the average diameter of less than 10 nm may cause a problem of the silicon-based active material particles not being exposed to the shell surface.

As the silicon-based active material, one or more types selected from the group consisting of crystalline silicon-based active materials, amorphous silicon-based active materials and silicon oxides ($SiO_x$, $0<x<2$) may be used, and specifically, when using silicon having a crystal grain size of 5 nm or less, high capacity and efficiency, and an excellent cycle life property may be exhibited, however, the silicon-based active material is not limited thereto.

The silicon-based active material particles may be separated from the core, and specifically, the silicon-based active material particles included in the negative electrode active material particle may all be separated from the core. The silicon-based active material particles not being in contact with the carbon-based active material may prevent a problem of reducing a cycle life by destroying the structure of the carbon-based active material when charged and discharged.

The negative electrode active material particle of the present disclosure includes a carbon-based active material suppressing dendrite formation as a core, and by the negative electrode active material particle including silicon-based active material particles capable of increasing lithium energy density on the core surface, high lithium energy density may be exhibited.

In addition, the silicon-based active material particles are attached to the surface of the carbon-based active material using the polymer material, and therefore, the silicon-based active material is not deintercalated from the carbon-based active material during an electrode manufacturing process, and as a result, effects of irreversible capacity decrease and conductivity improvement in the negative electrode active material may be obtained.

Furthermore, the silicon-based active material is capable of being exposed to the surface of the negative electrode active material particle, and is capable of being in direct contact with a conductor, and accordingly, more excellent conductivity is obtained.

Meanwhile, the carbon-based active material, the silicon-based active material and the polymer may be included in weight ratios of 65 to 93:5 to 20:2 to 15.

When the carbon-based active material is included in a weight ratio of less than 65 and the silicon-based active material is included in a weight ratio of greater than 20, problems may occur in the mechanical properties of the negative electrode active material due to substantial changes in the volume of the silicon-based active material, and when the carbon-based active material is included in a weight ratio of greater than 93 and the silicon-based active material is included in a weight ratio of less than 5, a problem of lithium energy density decrease may occur. In addition, when the polymer is included in a weight ratio of less than 2, a problem of silicon-based active material particle deintercalation may occur, and when the polymer is included in a weight ratio of greater than 15, the silicon-based active material particles are not formed to be exposed to the surface or the thickness of the shell increases, which leads to a problem of conductivity decease or lithium ion transfer being difficult.

One embodiment according to the present disclosure provides a method for preparing a negative electrode active material particle including forming preliminary particles by coating a polymer on a core (Step 1); and preparing a solution including the preliminary particles, the polymer and silicon-based active material particles, and then spray drying the result to form a shell in which the silicon-based active material particles are embedded on the core (Step 2).

Step 1 may be carried out by introducing a carbon-based active material into a polymer precursor, and stirring and drying/heat treating the result, and a method of ball milling the polymer and the carbon-based active material, a method of dissolving the polymer in water or an organic solvent, then mixing the carbon-based active material thereto carrying out dispersion using a homogenizer and drying the result, or the like, may be used.

Particularly, using a polymer precursor has an advantage of most uniformly coating the polymer on the surface of the carbon-based active material.

Meanwhile, when preparing a polyaniline polymer using a polymer precursor, the polymer precursor may include an aniline monomer and ammonium sulfate.

Step 2 is a step of forming a shell in which the silicon-based active material particles are embedded on the core, and specifically, is a step of preparing so that at least a part of the silicon-based active material particles include a part exposed to the shell surface.

A specific method of Step 2 may include introducing the preliminary particles, the polymer and the silicon-based active material particles to a solution including ethanol and water, and stirring the result to prepare a dispersion solution, and spray drying the result.

One embodiment of the present disclosure provides a secondary battery including a negative electrode coated with a negative electrode mixture including the negative electrode active material particle, a positive electrode and a liquid electrolyte.

The secondary battery according to the present disclosure includes the negative electrode active material particle, and the negative electrode active material particle has excellent conductivity by exposing at least a part of the silicon-based active material particles to the surface. In addition, the silicon-based active material particles and the carbon-based active material are adhered with a polymer material in between, and therefore, excellent energy density may be exhibited without forming resin crystalline, and as a result, high efficiency and an output property may be obtained in the secondary battery.

The positive electrode according to the present disclosure may be prepared by, for example, coating a positive electrode mixture prepared by mixing the positive electrode active material particles, a conductor and a binder, a filler and a solvent such as NMP on a positive electrode current collector, and then drying and rolling the result. The negative electrode may be prepared by coating slurry prepared by mixing a negative electrode mixture including the negative electrode active material particle of the present disclosure to an organic solvent on a negative electrode current collector, and then drying and rolling the result.

The positive electrode active material is not particularly limited, and specifically, lithium transition metal oxides may be used. Examples of the lithium transition metal oxide may include Li.Co-based composite oxides such as $LiCoO_2$, Li.Ni.Co.Mn-based composite oxides such as $LiNi_xCo_yM-n_zO_2$, Li.Ni-based composite oxides such as $LiNiO_2$, Li.Mn-based composite oxides such as $LiMn_2O_4$, and the like, and these may be used either alone or as a mixture of two or more.

The conductor is not particularly limited as long as it has conductivity without inducing chemical changes in the corresponding battery, and examples thereof may include graphite; carbon black such as carbon black, acetylene black, Ketjen black, channel black, furnace black, lamp black or thermal black; conductive fiber such as carbon fiber or metal fiber; metal powder such as fluorinated carbon, aluminum or nickel powder; conductive whiskers such as zinc oxide and potassium titanate; conductive metal oxides such as titanium oxide; conductive materials such as polyphenylene derivatives, and the like.

The positive electrode or the negative electrode may have a form of the positive electrode mixture or the negative electrode mixture being coated on a current collector. The current collector is not particularly limited as long as it has conductivity without inducing chemical changes in the corresponding battery, and examples thereof may include copper, stainless steel, aluminum, nickel, titanium, baked carbon, or aluminum or stainless steel of which surface is treated with carbon, nickel, titanium, silver or the like.

The liquid electrolyte may include a non-aqueous organic solvent and a metal salt.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfranc, 2-methyl tetrahydrofuran, dimethyl sulfoxide, 1,3-dioxorane, formamide, dimethylformamide, dioxorane, acetonitrile, nitromethane, methyl formate, methyl acetate, triester phosphate, trimethoxymethane, dioxorane derivatives, sulfolane, methyl sulfolane, 1,3-dimethyl-2-imidazolidinone, propylene carbonate derivatives, tetrahydrofuran derivatives, ether, methyl propionate and ethyl propionate.

As the metal salt, lithium salts may be used, and the lithium salt is a material favorably dissolved in the non-aqueous liquid electrolyte. Examples thereof may include LiCl, LiBr, LiI, $LiClO_4$, $LiBF_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate, imide and the like.

Another embodiment of the present disclosure provides a battery module including the secondary battery as a unit cell, and a battery pack including the same. The battery module and the battery pack include the secondary battery exhibiting a low resistance property and high capacity, and therefore, may be used as a power supply of any one or more medium to large sized devices of power tools, electric vehicles including electric vehicles (EV), hybrid electric vehicles (HEV) and plug-in hybrid electric vehicles (PHEV), or systems for power storage.

Hereinafter, examples of the present disclosure will be described in detail so as for those skilled in the art to readily carry out the present disclosure. However, the present disclosure may be implemented in various different forms and is not limited to the examples described herein.

Example 1

Step 1: Preparation of Negative Electrode Active Material Particle

Globular natural graphite having an average diameter ($D_{50}$) of 15 μm was prepared. An aniline monomer was introduced to water, the result was stirred for 10 minutes, and hydrochloric acid (HCl) was introduced thereto while maintaining stirring, and ammonium sulfate was slowly introduced thereto to prepare a polymer precursor. After introducing the natural graphite into the polymer precursor, the result was stirred for 4 hours at 0° C., and dried at a temperature of 40° C. to prepare preliminary particles having a polyaniline polymer coating layer formed on the surface of the natural graphite.

To the preliminary particles, a polyaniline polymer and nanosilicon particles having a average diameter ($D_{50}$) of 100 nm were mixed, and the result was added to a solvent including ethanol and water in a volume ratio of 1:10 to prepare a solution. The solution was stirred for 30 minutes at 400 rpm using a mechanical homogenizer to prepare a dispersion solution for spray drying. The dispersion solution was spray dried under a condition of inlet temperature of 180° C., aspirator of 95% and feeding rate of 12 using a mini spray-dryer (manufacturer: Buchi, model name: B-290 mini spray-dryer). Through this, a negative electrode active material particle in which the nanosilicon particles are embedded in a shell including polyaniline while being separated from the natural graphite was prepared. Herein, the weight ratio of natural graphite:nanosilicon particles:polyaniline in the prepared negative electrode active material particle was 80:10:10.

Step 2: Manufacture of Secondary Battery

A negative electrode mixture was prepared by mixing the negative electrode active material particle, CMC/SBR that is a binder, and carbon black that is a conductor. After coating the negative electrode mixture on a copper current collector, the result was dried in a vacuum oven at 130° C. and rolled to prepare a negative electrode. A porous polyethylene separator was provided between the negative electrode and a counter electrode using Li metal, a liquid electrolyte dissolving vinylene carbonate dissolved in 0.5% by weight in a mixed solution of methylethyl carbonate (EMC) and ethylene carbonate (EC) having a mixed volume ratio of 7:3, and 1 M concentration of $LiPF_6$ was injected to prepare a lithium coin half-cell.

Example 2

After mixing a polyaniline polymer and nanosilicon particles having an average diameter ($D_{50}$) of 100 nm to globular natural graphite having an average diameter ($D_{50}$) of 15 μm, the result was added to a solvent including ethanol and water in a volume ratio of 1:10 to prepare a solution. The solution was stirred for 30 minutes at 400 rpm using a mechanical homogenizer to prepare a dispersion solution for spray drying. The dispersion solution was spray dried under a condition of inlet temperature of 180° C., aspirator of 95% and feeding rate of 12 using a mini spray-dryer (manufacturer: Buchi, model name: B-290 mini spray-dryer). Through this, a negative electrode active material particle in which at least a part of the nanosilicon particles are exposed to a shell surface and the nanosilicon particles adjoin a core was prepared. Herein, the weight ratio of natural graphite:nanosilicon particles:polyaniline in the prepared negative electrode active material particle was 80:10:10.

After that, a lithium secondary battery was manufactured using the negative electrode active material particle, and by carrying out Step 2 of Example 1 in the same manner.

<Comparative Example 1> Preparation of Negative Electrode Active Material Particle Not Including Shell, and Manufacture of Secondary Battery After mixing globular natural graphite having an average diameter ($D_{50}$) of 15 μm and nanosilicon particles having an average diameter ($D_{50}$) of 100 nm in a weight ratio of 85:15, the result was added to a solvent including ethanol and water in a volume ratio of 1:10 to prepare a solution. The solution was stirred for 30 minutes at 400 rpm using a mechanical homogenizer to prepare a dispersion solution for spray drying. The dispersion solution was spray dried under a condition of inlet temperature of 180° C., aspirator of 95% and feeding rate of 12 using a mini spray-dryer (manufacturer: Buchi, model name: B-290 mini spray-dryer). Through this, unlike Example 1, a negative electrode active material particle that does not include a polymer shell was prepared.

After that, a lithium secondary battery was manufactured using the negative electrode active material particle, and by carrying out Step 2 of Example 1 in the same manner.

<Comparative Example 2> Preparation of Negative Electrode Active Material Particle in Which Silicon-Based Active Material Particles are Embedded in Shell Including Polymer but not Exposed to Shell Surface, and Manufacture of Secondary Battery The negative electrode active material particle prepared in Comparative Example 1 was introduced to a polymer precursor prepared by introducing an aniline monomer to water, stirring the result for 10 minutes, introducing hydrochloric acid (HCl) thereto while maintaining stirring, and slowly introducing ammonium sulfate thereto, and then the result was stirred for 4 hours at 0° C. and dried at a temperature of 40° C. to form a shell including a polymer on the particle surface. Through this, a negative electrode active material particle of Comparative Example 2 was prepared. In the prepared negative electrode active material particle, the nanosilicon particles were embedded in a shell, and were not exposed to the shell surface.

After that, a lithium secondary battery was manufactured using the negative electrode active material particle, and by carrying out Step 2 of Example 1 in the same manner.

<Comparative Example 3> Preparation of Negative Electrode Active Material Particle in Which Silicon-Based Active Material Particles are Embedded in Shell Formed by Pitch Coating so as Not to be Exposed to Surface, and Manufacture of Secondary Battery After mixing globular natural graphite having an average diameter ($D_{50}$) of 15 μm and nanosilicon particles having an average diameter ($D_{50}$) of 100 nm in a weight ratio of 85:15, the result was added to a solvent including ethanol and water in a volume ratio of 1:10 to prepare a solution. The solution was stirred for 30 minutes at 400 rpm using a mechanical homogenizer to prepare a dispersion solution for spray drying. The dispersion solution was spray dried under a condition of inlet temperature of 180° C., aspirator of 95% and feeding rate of 12 using a mini spray-dryer (manufacturer: Buchi, model name: B-290 mini spray-dryer) to prepare a particle in which the nanosilicon particles are distributed on the natural graphite surface.

10 g of the particles were pitch coated using coal tar pitch. The pitch coated globularized particles were heat treated at 980° C. under nitrogen atmosphere to prepare a negative electrode active material particle. Herein, the pitch coating layer was included in 12% by weight with respect to the total weight of the negative electrode active material particle.

After that, a lithium secondary battery was manufactured using the negative electrode active material particle, and by carrying out Step 2 of Example 1 in the same manner.

<Comparative Example 4> Preparation of Negative Electrode Active Material Particle in which Silicon-Based Active Material Particles are Disposed on Surface of Shell Including Polymer Instead of being Embedded, and Manufacture of Secondary Battery Globular natural graphite having an average diameter ($D_{50}$) of 15 μm was prepared. An aniline monomer was introduced to water, the result was stirred for 10 minutes, and hydrochloric acid (HCl) was introduced thereto while maintaining stirring, and ammonium sulfate was slowly introduced thereto to prepare a polymer precursor. After introducing the natural graphite into the polymer precursor, the result was stirred for 4 hours at 0° C., and dried at a temperature of 40° C. to prepare preliminary particles having a polyaniline polymer coating layer formed on the surface of the natural graphite.

To the preliminary particles, nanosilicon having an average diameter ($D_{50}$) of 100 nm was mixed, and the result was added to a solvent including ethanol and water in a volume ratio of 1:10 to prepare a solution. The solution was stirred for 30 minutes at 400 rpm using a mechanical homogenizer to prepare a dispersion solution for spray drying. The dispersion solution was spray dried under a condition of inlet temperature of 180° C., aspirator of 95% and feeding rate of 12 using a mini spray-dryer (manufacturer: Buchi, model name: B-290 mini spray-dryer). Through this, a negative electrode active material particle in which nanosilicon is disposed in the surface of a shell including polyaniline instead of being embedded was prepared. Herein, the weight ratio of natural graphite:metal silicon particles:polyaniline in the prepared negative electrode active material particle was 80:10:10.

<Test Example 1> Capacity Property

The secondary batteries manufactured in Examples 1 and 2 and Comparative Examples 1 to 4 were evaluated using the following method, and the results are shown in the following Table 1.

Charge and Discharge Evaluation Method

Charge CC (constant current)/CV (constant voltage) (5 mV/0.005 C current cut-off) condition Discharge CC (constant current) condition 1.5 V The first 2 cycles were charged and discharged with 0.1 C, and the $3^{rd}$ to the $49^{th}$ cycles were charged and discharged with 0.5 C. Charge and discharge were completed in a charged state of the $50^{th}$ cycle (state of lithium being in the negative electrode), the battery was disassembled to measure the thickness, and the electrode thickness change rate was calculated.

TABLE 1

| | Discharge Capacity [mAh/g] | Initial Efficiency [%] | Capacity Retention Rate (%) (Discharge Capacity at $49^{th}$/Discharge Capacity at $1^{st}$ *100) | Electrode Thickness Change Rate (%) (Amount of Thickness Change/Initial Thickness) ($50^{th}$ Charge) |
|---|---|---|---|---|
| Example 1 | 520 | 91 | 90 | 88 |
| Example 2 | 519 | 90 | 88 | 96 |
| Comparative Example 1 | 519 | 88 | 54 | 230 |
| Comparative Example 2 | 380 | 80 | 88 | 89 |
| Comparative Example 3 | 514 | 89 | 80 | 190 |
| Comparative Example 4 | 518 | 84 | 85 | 104 |

As shown in Table 1, it was seen that Examples 1 and having a polymer layer exhibited enhanced capacity retention rates compared to Comparative Example 1 without a polymer layer. In addition, it was seen that Examples 1 and 2 had significantly smaller electrode thickness change rates compared to Comparative Example 1. Through the results, it was seen that an excellent capacity retention rate was obtained since binding force between the silicon particles and the graphite particles increases due to the polymer layer, and an electrode thickness change rate decreased by the polymer controlling silicon particle swelling.

Comparative Example 2 in which a shell including a polymer is included but silicon-based active material particles are disposed adjoining a core without being exposed to the shell surface had significantly lower discharge capacity compared to Examples 1 and 2, and initial efficiency was inferior. Furthermore, it was identified that Comparative Example 2 also had a capacity retention rate lower than Example 1.

In addition, it was identified that, in Comparative Example 3 carrying out pitch coating, silicon particle swelling was not readily controlled, and deintercalation of graphite and silicon particles occurred. Accordingly, it was identified that Comparative Example 3 had a higher electrode thickness change rate compared to Examples 1 and 2, and a capacity retention rate was inferior.

Comparative Example 4 relates to an active material in which silicon particles are not embedded in a shell, and are distributed on a shell surface, and herein, the specific surface area of the silicon particles exposed outside increased, and the shell was not able to control silicon particle swelling, and therefore, significant silicon particle swelling occurred leading to a significant change in the electrode thickness.

Meanwhile, in Example 2 in which silicon particles adjoin a core, it was seen that initial efficiency and a capacity retention rate were rather reduced compared to Example 1 in which silicon particles and a core were separated. This is considered to be due to damages to the core caused by silicon particles when charged and discharged in Example 2.

Hereinbefore, preferred embodiments of the present disclosure have been described in detail, however, the scope of a right of the present disclosure is not limited thereto, and various modifications and improvements made by those skilled in the art using basic concepts of the present disclosure defined in the attached claims also belong to the scope of a right of the present disclosure.

REFERENCE NUMERAL

110: Core Including Carbon-Based Active Material
120: Shell Including Polymer
130: Silicon-Based Active Material Particle

What is claimed is:

1. A negative electrode active material particle comprising:
   a core comprising a carbon-based active material; and
   a shell comprising a polymer coating on the core,
   wherein silicon-based active material particles are embedded in the polymer coating,
   wherein at least a part of the silicon-based active material particles are protruding from an outer surface of the shell, and
   wherein all the silicon-based active material particles are not in contact with the carbon-based active material.

2. The negative electrode active material particle of claim 1, wherein the polymer is a polymer having a π-bond.

3. The negative electrode active material particle of claim 1, wherein the polymer is one or more types selected from the group consisting of poly(1-pyrenemethyl methacrylate) which is a homopolymer of pyrene, poly(1-pyrenemethyl methacrylate-co-triethylene oxide methyl ether methacrylate) which is a copolymer of pyrene, a polymer changing the pyrene side chain of the homopolymer or the copolymer of pyrene to anthracene, polyparaphenylene, polyaniline, poly(9,9-dioctylfluorene-co-fluorenone-co-methylbenzoic ester), and polyacetylene having a conjugation bond.

4. The negative electrode active material particle of claim 1, wherein the carbon-based active material is one or more types selected from the group consisting of natural graphite, artificial graphite, hard carbon and soft carbon.

5. The negative electrode active material particle of claim 1, wherein the carbon-based active material, the silicon-based active material and the polymer are included in a weight ratio of 65 to 93:5 to 20:2 to 15.

6. The negative electrode active material particle of claim 1, wherein the silicon-based active material particles have an average diameter ($D_{50}$) of 10 nm to 150 nm.

7. The negative electrode active material particle of claim 1, wherein the shell has a thickness of 20 nm to 100 nm.

8. A secondary battery comprising:
   a negative electrode coated with a negative electrode mixture including the negative electrode active material particle of claim 1;
   a positive electrode; and
   a liquid electrolyte.

9. A battery module comprising the secondary battery of claim 8 as a unit cell.

10. A battery pack comprising the battery module of claim 9, and used as a power supply of a device.

11. The battery pack of claim 10, wherein the device is selected from the group consisting of electric vehicles, hybrid electric vehicles, plug-in hybrid electric vehicles and systems for power storage.

12. The negative electrode active material particle of claim 1, wherein the silicon-based active material particles are only attached to a surface of the carbon-based active material using the polymer.

13. A method for preparing the negative electrode active material particle according to claim 1, comprising:
   forming preliminary particles by coating a polymer on a core comprising a carbon-based active material (Step 1); and
   preparing a solution including the preliminary particles, the polymer and silicon-based active material particles, and then spray drying the result to form a shell in which the silicon-based active material particles are embedded in the polymer coating (Step 2),
   wherein at least a part of the silicon-based active material particles are protruding from an outer surface of the shell, and
   wherein all the silicon-based active material particles are not in contact with the carbon-based active material.

* * * * *